(12) United States Patent
Krogmann et al.

(10) Patent No.: US 6,346,697 B1
(45) Date of Patent: Feb. 12, 2002

(54) IMAGE RESOLVING DETECTOR ARRANGEMENT

(75) Inventors: Dirk Krogmann, Owingen; Hans Dieter Tholl, Uhldingen, both of (DE)

(73) Assignee: Bodenseewerk Geratetechnik GmbH, Überlingen/Bodensee (DE)

( * ) Notice: Subject to any disclaimer, the term of this patent is extended or adjusted under 35 U.S.C. 154(b) by 0 days.

(21) Appl. No.: 09/499,051

(22) Filed: Feb. 4, 2000

(30) Foreign Application Priority Data

Feb. 6, 1999 (DE) .......................................... 199 04 914

(51) Int. Cl.$^7$ ............................................. H01L 27/00
(52) U.S. Cl. ..................................... 250/208.1; 359/247
(58) Field of Search .............................. 250/208.1, 348, 250/294, 296, 302, 226; 358/513; 359/639, 247

(56) References Cited

U.S. PATENT DOCUMENTS 5,519,206 A * 5/1996 Uwira ...................... 250/208.1
6,005,721 A * 12/1999 Baumann et al. ........... 359/639

* cited by examiner

Primary Examiner—Robert H. Kim
Assistant Examiner—Courtney Thomas
(74) Attorney, Agent, or Firm—Mallinckrodt & Mallinckrodt; Robert R. Mallinckrodt

(57) ABSTRACT

In an image resolving detector arrangement, an image of an object scene is generated by an imaging optical system. Radiation from a respective one of several adjacent image elements of an image area associated with the detector element is directed consecutively onto each of the detector elements by an image element selection device. Herein the image element selection device is formed by a micro-light stop raster, which is arranged in an image plane and moveable step by step in this image plane, and which, in each position, allows only radiation from a part of an image area associated to a detector element to pass onto the detector element. Thereby, the resolution of the image resolving detector arrangement is improved.

7 Claims, 2 Drawing Sheets

IMAGE RESOLVING DETECTOR ARRANGEMENT

BACKGROUND OF THE INVENTION

The invention relates to an image resolving detector arrangement with an image resolving detector having a two-dimensional array of detector elements and an imaging optical system, which generates an image of an object scene on this image resolving detector, and image element selection means, by means of which radiation of respectively one of several adjacent image elements of an image area associated to the detector element is directed consecutively onto each of the detector elements.

Such an arrangement is known from U.S. Pat. No. 5,519, 206. This patent describes a passive image resolving detector arrangement having a matrix detector, on which an image of an object scene is generated by imaging optical means and which consists of a two-dimensional arrangement of detector elements. A micro-mechanical mirror raster with a two-dimensional arrangement of mirror elements is provided. Each mirror element is pivotable into first and second operative positions by binary control signals. The object scene will be imaged with high resolution onto the micro-mechanical mirror raster by a first imaging optical system. The micro-mechanical mirror raster will be imaged on the matrix detector by a second optical system in that way that one sub matrix of the micro-mechanical mirror raster with a plurality of mirror elements will be imaged onto each detector element. In their first operative positions, the mirror elements direct the imaging beams past the matrix detector, while, in their second operative positions, they direct the imaging beams onto each associated detector element of the matrix detector. The micro-mechanical mirror raster is controlled such that in cyclic sequence pre-determined mirror elements of the sub-matrices are in their second operative positions and the other mirror elements of the sub-matrix are in their first operative positions.

In this way, images of one pixel each per sub-matrix will be generated consecutively by the matrix detector. These images may then be interspersed "electronically" in a memory. An electronic image results, the resolution of which is not determined by the matrix detector but by the mirror raster.

European patent 0,133,890 discloses an electro-optical detector system for generating electronic image information. This detector system has a charge coupled matrix detector consisting of an arrangement of rows and columns of square detector elements. Interspaces between the detector elements have a width which is substantially equal to the side length of the detector elements. An image of the object scene is moved step by step relative to the matrix detector to the corners of the square by a wobbling mirror which is consecutively stepped on into four positions, the path of rays of the image beam being reflected by this wobbling mirror. Thereby each detector element cyclically detects consecutively four adjacent areas of the image of the object scene. In a computer, the image information is then assembled to a continuous "image".

DISCLOSURE OF THE INVENTION

It is the object of the invention to improve the resolution of a detector arrangement by simple means.

To this end, an image of an object scene is generated on a two dimensional array of detector elements by an imaging optical system. A micro-light stop raster, of which each micro-light stop defines an aperture, is arranged in an image plane of this imaging optical system. Each of these micro-light stops is associated with one of the detector elements. The micro-light stop raster is moved step-by-step in this image plane to a number of discrete positions. In each position, each micro-light stop aperture permit radiation from only a part of the image area associated with the respective micro-light stop to fall on the detector element.

In this way, the resolution of the detector arrangement is defined by the dimensions of the micro-light stop raster instead of the dimensions of the detector element raster. Each detector element covers a plurality of smaller picture elements, the size and spacing of these picture elements being defined by the size of the light stop aperture and the steps carried out by the micro-light stop raster. This is achieved without having to deflect the path of rays by mirrors, as with the prior art discussed hereinbefore.

Further objects and modifications of the invention will be apparent to those skilled in the art, when reading the following description of preferred embodiments of the invention.

Embodiments of the invention will now be described in further detail with the reference to the accompanying drawings.

PREFERRED EMBODIMENTS OF THE INVENTION

Figure 1:
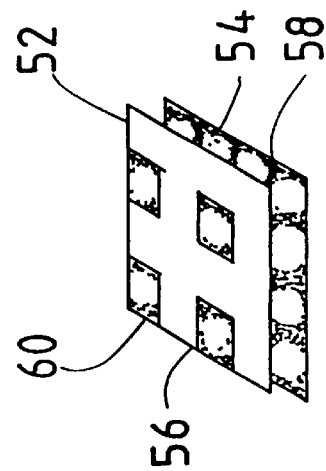
FIG. 1 is a schematic perspective illustration of the first embodiment of the invention.

Referring to FIG. 1, a section of a two-dimensional arrangement of detector elements is designated by numeral 10. The illustrated section comprises four square detector elements 12. The edge length of a detector element 12 is 40 $\mu$m. The detector elements are mounted on the rear side of a substrate 14 made of CdZnTe. A micro-lens raster 16 having etched lenses 18 is formed on the front surface of the substrate. The raster measure of the micro-lens raster 16 is equal to the raster of the detector element 12, it is thus also 40 $\mu$m. Thus one lens 18 of the micro-lens raster 16 is associated to each detector element 12. The lenses 18 are coaxial to the detector elements 12.

A substrate 20 provided with the detector elements 12 and the micro-lens raster 16 is located in front of the substrate 14 having a micro-light stop raster 22. The micro-light stop raster 22 consists of squared light stop patterns 24 and has a raster measure of 40 $\mu$m, corresponding to the raster measure of the detector arrangement 10 and the micro-lens raster 16.

Each of the squared light stop patterns 24 has four quadrants. Of these quadrants, a first quadrant at the rear left in FIG. 1 is transparent and forms an aperture 26. The three other quadrants are opaque or not transparent to light. Thus the quadrants have dimensions of 20 μm×20 μm each.

The substrate 20 with the micro-light stop raster is movable by piezo actuators into four positions in 20 μm steps in two mutually orthogonal directions, as indicated by arrows 28 and 30 in FIG. 1. In the first position, the apertures 26 are respectively aligned with the left rear quadrant of the associated detector elements 12. In the second position, the micro-light stop raster is displaced by a 20 μm step to the right by the piezo actuator 28, thus the apertures 26 are respectively aligned with the right rear quadrant of the associated detector elements. In the third position, both piezo actuators 28 and 30 are activated. The substrate 20 with the micro-light stop raster 22 is displaced by a 20 μm step to the front and by a 20 μm step to the right in FIG. 1. In this position, the apertures 26 are then respectively aligned with the right front quadrant of the associated detector elements 12. Finally in the fourth position, the piezo actuator 28 is in its initial position, but the piezo actuator 30 has displaced the substrate 20 with the micro-light stop raster by a 20 μm step to the front in FIG. 1. The apertures 26 are respectively aligned with the left front quadrant of the associated detector elements 12. The piezo actuators are energized in cyclic sequence.

An image of an object scene is generated in the plane of the micro-light stop raster 22. Four adjacent image elements are generated on each of the squared light stop patterns 24. These four image elements are associated with one detector element 12. Out of these four image elements one at a time is detected by the detector element 12 through the aperture 26. Due to the cyclic movement of the micro-light stop raster 22 in the above mentioned four positions, each detector element 12 successively detects the four image elements associated therewith. The lenses 18 of the micro-lens raster 16 concentrate the photons in the center of the respective associated detector elements 12, and thus increase the filling factor.

Figure 2:
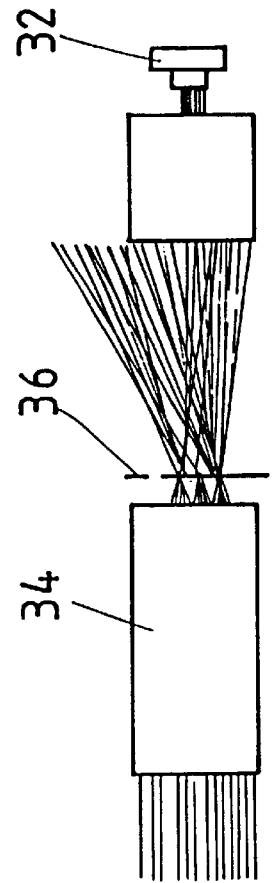
FIG. 2 shows the path of rays of an image resolving detector arrangement in which by means of a micro optic beam deflector element on one hand different areas of a field of view are successively imaged onto a two-dimensional detector arrangement, and on the other hand an improvement of the resolution is obtained in similar way as with the arrangement of FIG. 1.

FIG. 2 illustrates an image resolving detector arrangement permitting successive detection of different fields of views or of different sections of a field of view by means of a two-dimensional array 32 of detector elements, also these sections of the field of view being then combined to form an "electronic" image of the total field of view. This detector arrangement comprises a first imaging optical system 34. The first imaging optical system generates superposed images of different sections of a field of view in an intermediate image plane 35.

To this end, the first imaging optical system 34 is a lens system 36, a prism structure 38 in form of a flat pyramid being arranged on the object side of the lens system in the entrance pupil. One can then imagine the pupil to be divided into sections 40,42,44 and 46, the path of rays of each section passing through an associated lateral surface of the prism structure. Thereby, different sections of the field of view are imaged coincident one above the other in the intermediate image plane 36.

A second imaging optical system 48 images the intermediate image plane 36 onto the two-dimensional array 32 of detector elements.

Figure 4:
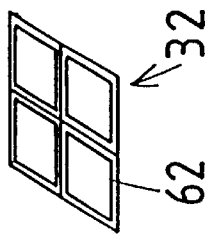
FIG. 4 is a schematic perspective illustration and illustrates the mode of operation of the beam deflector element in FIG. 2.

A micro optical beam deflector element 50 is located in the intermediate image plane 36. This micro optical beam deflector element 50 comprises two mutually displaceable micro optical lens rasters 52 and 54 (FIG. 4). The micro optical lens raster 52 on the object side is formed by converging lenses 56, and the micro optical lens raster 54 on the image side is formed by dispersing lenses 58. The lens raster may be displaced relatively to the lens raster 54. Thereby a beam deviation is obtained. The displacement is effected such that rays from the different sections 40,42,44, and 46 of the pupil of the first imaging optical system 34 are consecutively guided onto the second imaging optical system 48, and are used for generating an image on the arrangement 32 of detector elements. Thereby the different sections of the field of view may be consecutively detected by means of a single arrangement 32 of detector elements. These sections are then "electronically" combined to form a total image of the field of view of the object scene in the memory. Thereby the large field of view can be detected with a resolution which is supplied by the arrangement 32 of detector elements. Normally this arrangement 32 would only detect a smaller field of view.

The displacement of the micro optic lens raster 52 relative to the lens raster 54 for the change-over between the different sections of the field of view is small as compared with the raster measure. The lens raster 52 is moved in "first positions", in each of these positions directing the rays from one of the sections 40,42,44 and 46 onto the second optical system 48. The micro optic lens raster 52 is formed and controllable such that in each of the "first" positions it causes an increase of the resolution of the image resolving detector arrangement.

To this end the micro optic lens raster 52 is designed to form a micro-light stop raster, similar to that of FIG. 1. The micro-light stop raster contains a raster of squared light stop patterns 60. Each light stop pattern contains four quadrants similar to FIG. 1. One of these quadrants has a convergent lens 56. This convergent lens 56 corresponds to the aperture 26 of FIG. 1. The other three quadrants of each light stop pattern are opaque. The raster measure of the micro-light stop raster (or lens raster) 52 and of the lens raster 54, is selected such that the light stop pattern and the double lens raster 54, respectively are imaged onto the raster of the two-dimensional array 32 of detector elements by the second optical system. Thus, the four quadrants of the light stop pattern 60 are associated to one common detector element 62. In this embodiment the lateral length of the squared detector elements 62 is 40 μm like in FIG. 1. The lateral length of the squared light stop raster 60 and of one field of four dispersing lenses 58 in the lens raster 54, respectively, is 100 μm. The second optical system 42 reduces the intermediate image by the ratio 1:2.5.

Starting out from the "first" positions, now the micro optic lens raster formed as diaphragm raster is moved, in addition, consecutively like in FIG. 1 by the raster measure that is 50 μm to the right and to the front into four "second" positions. This happens in the same way as described with reference to FIG. 1. Thereby four smaller adjacent image areas corresponding to the quadrants are detected consecutively by each detector element 62. Also these thus detected brightness values may be interspersed "electronically" in a memory for generating an electronic image of higher resolution.

Figure 3:
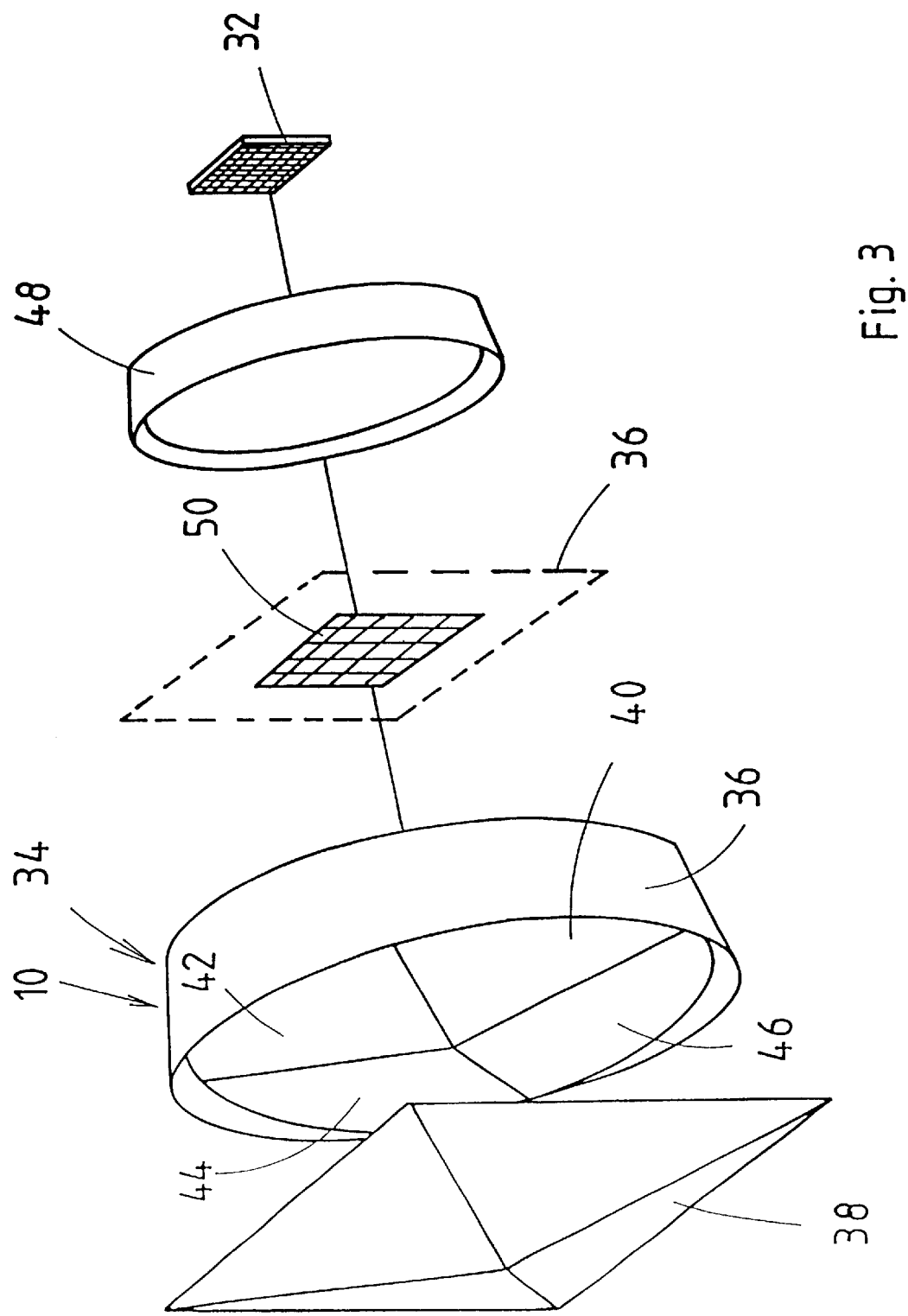
FIG. 3 is a schematic perspective illustration and illustrates the construction of the optical systems for detecting different sections of a field of view in a image resolving detector arrangement of FIG. 2.

In the embodiment according to FIGS. 2 to 4, the two micro-optical lens rasters 52 and 54 which permit widening of the field of view, are used, simultaneously, by adequate formation and control of the lens rasters to increase the resolution.

We claim:

1. An image resolving detector arrangement, comprising a two-dimensional array of detector elements defining a detector raster, an imaging optical system means having at least one image plane for generating an image of an object scene on said two-dimensional array of detector elements, and image element selection means for directing radiation from each one of a plurality of adjacent picture elements of an image area associated with a detector element consecutively onto said detector element, said image element selection means comprising a micro-light stop raster means defining rectangular raster elements and arranged in an image plane of said imaging optical system, and means for moving said micro-light stop means step by step in said image plane, said micro-light stop means, in each position, permitting radiation from only a part of each of said image areas associated with a detector element to pass onto said detector element.

2. An image resolving detector element as claimed in claim 1, wherein the dimensions of said rectangular raster elements of the micro-light stop raster (22) are equal to the dimensions of the detector elements (12) of the two-dimensional array (10) of detector elements; said rectangular raster elements having four substantially identical quadrants, out of said four identical quadrants of the raster elements of the micro-light stop raster one being transparent and defining an aperture and the other three being opaque; and actuator means for moving said micro-light stop raster by a half raster measure of said detector raster in two directions relative to the two-dimensional array of detector elements.

3. An image resolving detector arrangement as claimed in claim 2, wherein said actuator means comprise piezo actuators.

4. An image resolving detector arrangement as claimed in claim 1, and further comprising a micro-lens raster arranged between said micro-light stop raster and said two-dimensional array of detector elements, said micro-lens raster having a raster measure equal to those of said micro-light stop raster and said two-dimensional array of detector elements.

5. An image resolving detector arrangement as claimed in claim 4, and further comprising a substrate having a front surface and a rear surface, said micro-lens raster being provided on said front surface of said substrate, and said detector elements being formed on said rear surface of said substrate.

6. An image resolving detector arrangement as claimed in claim 1, wherein said imaging optical system comprises a first imaging optical partial system having a pupil, and a second imaging optical partial system, a plurality of pupil-areas being defined in said pupil of said first imaging optical partial system, each of said pupil areas imaging an associated field of view in a common image plane area, a micro-optical beam deflector means being arranged in said image plane and comprising a pair of micro-optical lens rasters and means for displacing one of said lens rasters relative to the other one, said second imaging optical partial system being arranged to image said micro-optical beam deflector means onto said two-dimensional arrangement of detector elements (62), each of the raster elements of said micro-optical lens raster being imaged on an associated one of said detector elements of said two-dimensional array of detector elements, each raster element of said micro-lens raster defining four quadrants, a micro-optical lens being provided in one quadrant, the three other quadrants being opaque and means being provided for displacing said micro-optical lens raster such that:

in successive first relative positions said beam deflector means direct consecutively in time radiation from the different pupil areas onto said second imaging optical partial system, and in each of said first positions said lens raster with said opaque quadrants is displaced consecutively by the raster measure in two directions into second positions.

7. An image resolving detector arrangement as claimed in claim 6, wherein one of said lens rasters comprises converging lenses and the other one of said lens rasters comprises dispersing lenses.

* * * * *